(12) United States Patent
Oshita et al.

(10) Patent No.: US 9,141,246 B2
(45) Date of Patent: Sep. 22, 2015

(54) TOUCH PAD

(71) Applicant: ALPS ELECTRIC CO., LTD., Tokyo (JP)

(72) Inventors: Kazuhito Oshita, Miyagi-ken (JP); Hiroshi Shigetaka, Miyagi-ken (JP); Masafumi Takagi, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 27 days.

(21) Appl. No.: 14/251,202

(22) Filed: Apr. 11, 2014

(65) Prior Publication Data

US 2015/0035795 A1    Feb. 5, 2015

(30) Foreign Application Priority Data

Aug. 5, 2013    (JP) ................... 2013-162084

(51) Int. Cl.
    *G06F 3/045*    (2006.01)
    *G06F 3/044*    (2006.01)
(52) U.S. Cl.
    CPC ..................................... *G06F 3/044* (2013.01)
(58) Field of Classification Search
    None
    See application file for complete search history.

(56) References Cited

U.S. PATENT DOCUMENTS

| | | | |
|---|---|---|---|
| 2009/0095540 A1 | 4/2009 | Zachut et al. | |
| 2009/0174679 A1* | 7/2009 | Westerman | 345/173 |
| 2011/0069021 A1* | 3/2011 | Hill | 345/173 |
| 2013/0300696 A1* | 11/2013 | Haran et al. | 345/173 |
| 2013/0328832 A1* | 12/2013 | Boumgarten | 345/174 |
| 2014/0306912 A1* | 10/2014 | Woolley | 345/173 |

* cited by examiner

*Primary Examiner* — Alexander Eisen
*Assistant Examiner* — Kebede Teshome
(74) *Attorney, Agent, or Firm* — Beyer Law Group LLP (57) ABSTRACT

In a case where a touch position is a peripheral portion, when spatial characteristics which correspond to an area and a length of a touch region exceed a first condition corresponding to a predetermined area and length, it is determined that the touch region is caused by a palm. When the spatial characteristics do not exceed the first condition, it is determined that the touch region is caused by a finger. In a case where a touch position is a central portion, when the spatial characteristics exceed a second condition corresponding to an area and a length that are larger than those of the first condition, it is determined that the touch region is caused by a palm. When the spatial characteristics do not exceed the second condition, it is determined that the touch region is caused by a finger.

10 Claims, 6 Drawing Sheets

FIG. 6

TOUCH PAD

CLAIM OF PRIORITY

This application claims benefit of Japanese Patent Application No. 2013-162084 filed on Aug. 5, 2013, which is hereby incorporated by reference.

BACKGROUND OF THE INVENTION

1. Field of the Invention

The present invention relates to a touch pad which is mounted on a notebook PC and the like.

2. Description of the Related Art

In recent years, there has been a tendency for touch pads mounted on a notebook PC and the like to be increased in size. However, in a case of the increase in size of the touch pad, there is a tendency for a touch of a palm to be performed when operating a keyboard, and thus an operational error is likely to occur. The present invention relates to means for preventing the operational error (palm determination function or palm rejection function).

U.S. Unexamined Patent Application Publication No. 2009-0095540 discloses that the determination of whether being a finger or a palm is performed on the basis of spatial characteristics such as an area, shape, and the like of a touch region and that an operation is set to be in an invalid state when being determined to be a palm. Accordingly, it is possible to prevent an operational error from occurring due to a palm. However, when spatial characteristics of a touch region when being touched by a finger are similar to those when being touched by a palm, it may be determined that a touch is caused by a palm in spite of the touch being caused by a finger, and thus an operation may be set to be in an invalid state. Thus, there is a problem in that it is not possible to smoothly perform a normal operation by a finger.

SUMMARY OF THE INVENTION

The present invention provides a touch pad capable of effectively preventing an operational error from occurring due to a palm and smoothly performing a normal operation by a finger.

A touch pad according to an aspect of the invention includes detection means for outputting a variable according to a proximate state of an object with respect to an operation surface; and control means for calculating a touch region and a touch position of the object on the basis of the variable, and which has a palm determination function of determining whether the touch region is caused by a finger or a palm, on the basis of spatial characteristics of the touch region and a predetermined determination condition. In a case where the touch position is a peripheral portion of the operation surface, when spatial characteristics corresponding to an area or a length of the touch region exceed a first condition corresponding to a predetermined area or length, the control means determines that the touch region is caused by a palm. When the spatial characteristics do not exceed the first condition, the control means determines that the touch region is caused by a finger. In a case where the touch position is a central portion of the operation surface, when the spatial characteristics exceed a second condition corresponding to an area or a length that are larger than those of the first condition, the control means determines that the touch region is caused by a palm. When the spatial characteristics do not exceed the second condition, the control means determines that the touch region is caused by a finger.

In the touch pad according to the aspect of the invention, there is a tendency to be determined to be a palm at a location where a palm is positioned frequently, and there is a tendency to be determined to be a finger at a location where a finger is positioned frequently. For this reason, it is possible to effectively prevent an operational error from occurring due to a palm and to smoothly perform a normal operation by a finger.

A touch pad according to another aspect of the invention includes detection means for outputting a variable according to a proximate state of an object with respect to an operation surface; and control means for calculating a touch region and a touch position of the object on the basis of the variable, and which has a palm determination function of determining whether the touch region is caused by a finger or a palm, on the basis of spatial characteristics of the touch region and a predetermined determination condition. When the touch position is a peripheral portion of the operation surface, the control means sets the palm determination function to be in a valid state. When the touch position is a central portion of the operation surface, the control means sets the palm determination function to be in an invalid state.

In the touch pad according to the aspect of the invention, being a finger is necessarily determined at a location where a finger is positioned frequently. For this reason, it is possible to smoothly perform a normal operation by a finger.

In the touch pad according to the aspect of the invention, when it is determined that a keyboard is being operated, the control means may set the palm determination function to be in a valid state. When it is not determined that a keyboard is being operated, the control means may set the palm determination function to be in an invalid state.

In the touch pad according to the aspect of the invention, there is a tendency to be determined to be a palm at a location where a palm is positioned frequently, and there is a tendency to be determined to be a finger at a location where a finger is positioned frequently. For this reason, it is possible to effectively prevent an operational error from occurring due to a palm and to smoothly perform a normal operation by a finger.

According to the present invention, there is a tendency to be determined to be a palm at a location where a palm is positioned frequently, and there is a tendency to be determined to be a finger at a location where a finger is positioned frequently. For this reason, an effect is exhibited which is capable of effectively preventing an operational error from occurring due to a palm and allowing a normal operation by a finger to be smoothly performed.

DESCRIPTION OF THE PREFERRED EMBODIMENTS

Figure 1:
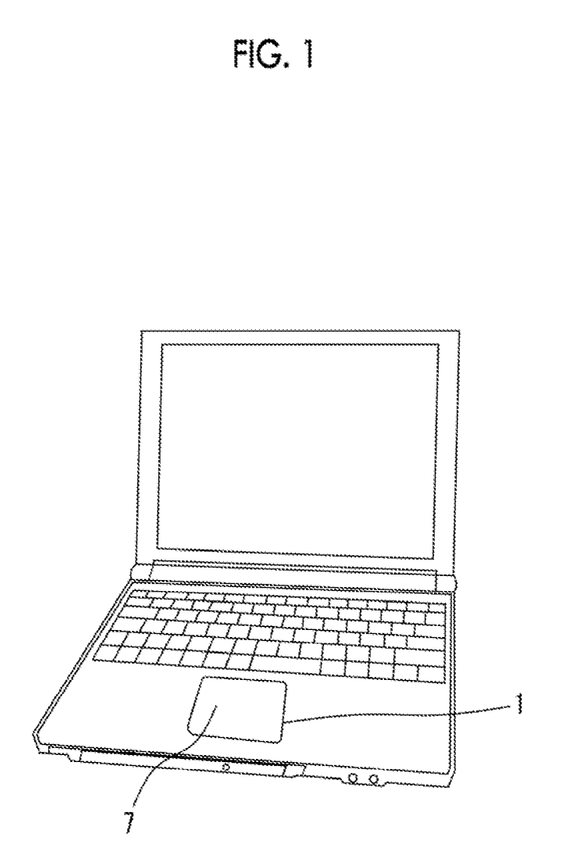
FIG. 1 is a diagram illustrating a state where a touch pad 1 according to a first embodiment is mounted on a notebook PC.

A touch pad 1 according to a first embodiment will be described below with reference to FIGS. 1 to 5. FIG. 1 is a diagram illustrating a state where the touch pad 1 is mounted on a notebook PC. An operation plate is attached to an uppermost surface of the touch pad 1, and the surface of the operation plate serves as an operation surface 7.

Figure 2:
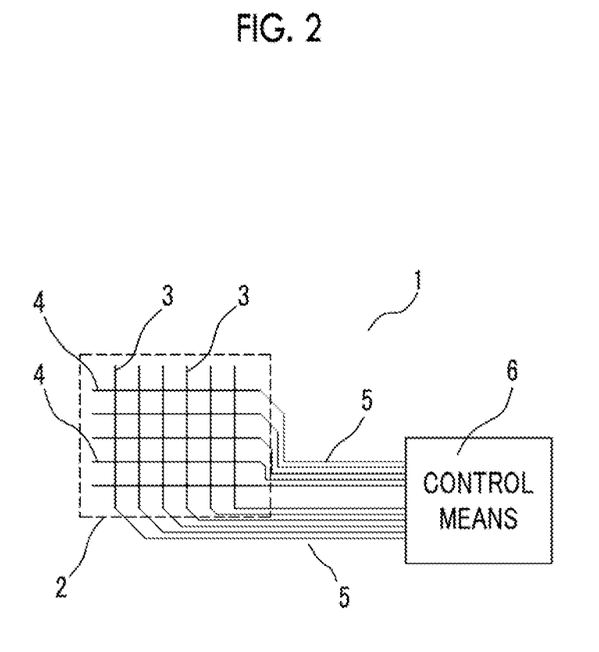
FIG. 2 is a system configuration diagram of the touch pad 1 according to the first embodiment.

FIG. 2 is a system configuration diagram of the touch pad 1. The touch pad 1 includes a plurality of X electrodes 3 and a plurality of Y electrodes 4 which are laid in a substrate 2, and these electrodes are connected to control means 6 through wirings 5. The control means 6 applies a voltage using any one of the X electrodes 3 and the Y electrodes 4 as driving electrodes, detects a voltage using the other one thereof as detecting electrodes, and detects a change in capacitance in a case where a finger or the like approaches the substrate 2, thereby calculating coordinates of the finger or the like. Meanwhile, the X electrodes 3 and the Y electrodes 4 of this embodiment are detection means that outputs a voltage converted into a capacitance value. However, the present invention is not limited thereto, and a method may be used of detecting and outputting other variables such as, for example, pressure of a finger.

Figure 3:
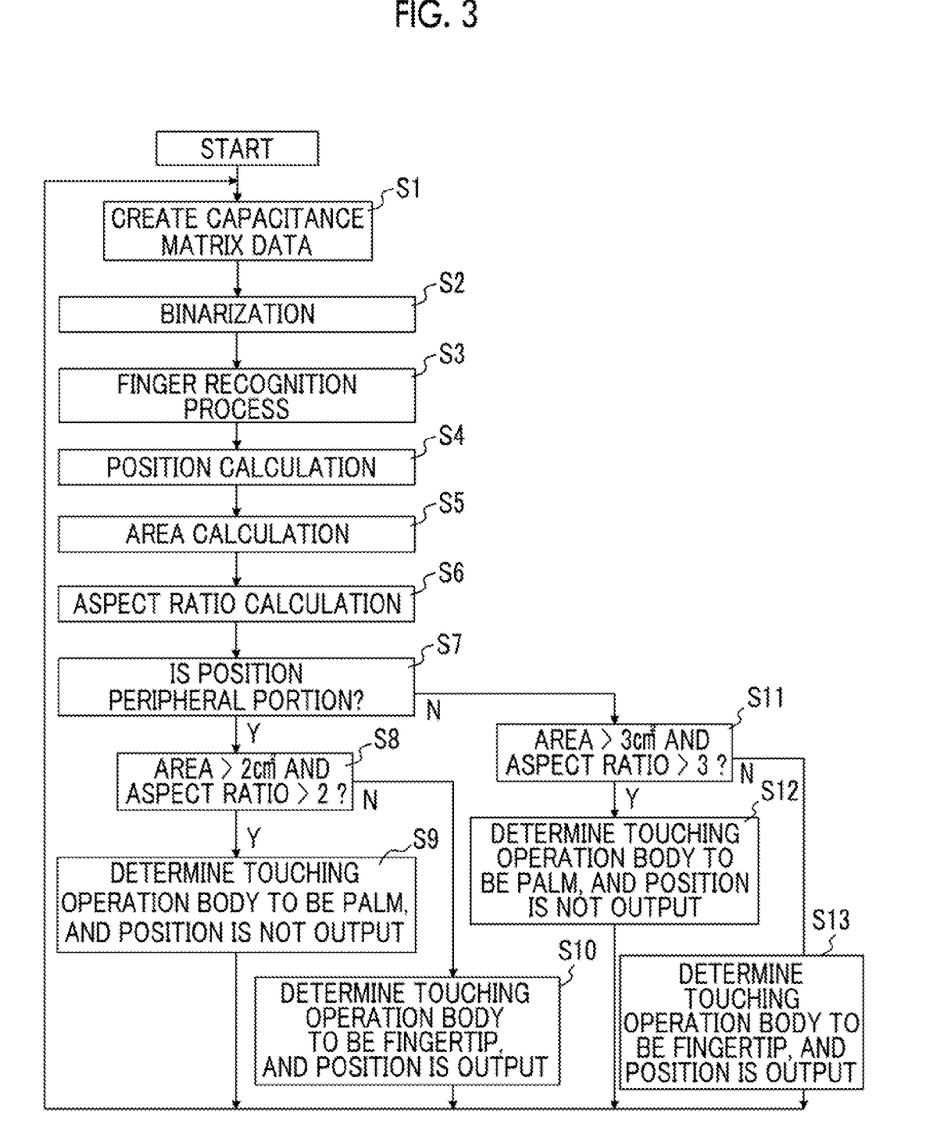
FIG. 3 is a flow chart of control means 6 according to the first embodiment.

FIG. 3 is a flow chart of the control means 6 according to the first embodiment. An operation of the touch pad 1 according to the first embodiment will be described below with reference to FIG. 3.

First, in step S1, capacitance matrix data is created. The matrix data is obtained by calculating a capacitance value for each separated region on the basis of the driving situation of a driving electrode and a voltage detected by the detecting electrode.

Next, in step S2, binarization is performed using a predetermined threshold value as a criterion of determination. The calculated capacitance value is compared with the predetermined threshold value. When the capacitance value exceeds the predetermined threshold value, 1 is set, and when the capacitance value does not exceed the threshold value, 0 is set.

Next, in step S3, a finger recognition process is performed. This process is a process of recognizing a touch region in which portions having binarized data being 1 are contiguously present and of recognizing the touch region as an operation body such as a finger.

Next, in step S4, position calculation is performed. The term "position" used herein corresponds to, for example, a centroid of the touch region indicating a touch of the operation body such as a finger, and is used for movement control of a pointer displayed on a screen, and the like.

Next, in step S5, area calculation is performed.

Next, in step S6, an aspect ratio is calculated. The term "aspect ratio" used herein is a value obtained by dividing a long diameter by a short diameter, for example, in a case of an elliptical touch region.

Next, in step S7, it is determined whether the touch region is positioned peripherally. When it is determined that the touch region is positioned peripherally, the operation proceeds to step S8 to determine whether an area is equal to or greater than 2 square centimeters and whether an aspect ratio is equal to or greater than 2.

When it is determined in step S8 that the area is equal to or greater than 2 square centimeters and that the aspect ratio is equal to or greater than 2, the operation proceeds to step S9 to determine a touching operation body to be a palm, and a position is not output.

When it is determined in step S8 that the area is equal to or greater than 2 square centimeters and that the aspect ratio is not equal to or greater than 2, the operation proceeds to step S10 to determine the touching operation body to be a finger, and a position is output.

When it is not determined in step S7 that the touch region is positioned peripherally, that is, when the touch region is positioned in a central portion 22 to be described later, the operation proceeds to step S11 to determine whether the area is equal to or greater than 3 square centimeters and whether the aspect ratio is equal to or greater than 3.

When it is determined in step S11 that the area is equal to or greater than 3 square centimeters and that the aspect ratio is equal to or greater than 3, the operation proceeds to step S12 to determine a touching operation body to be a palm, and a position is not output.

When it is determined in step S11 that the area is equal to or greater than 3 square centimeters and the aspect ratio is not equal to or greater than 3, the operation proceeds to step S13 to determine the touching operation body to be a finger, and a position is output.

Figure 4:
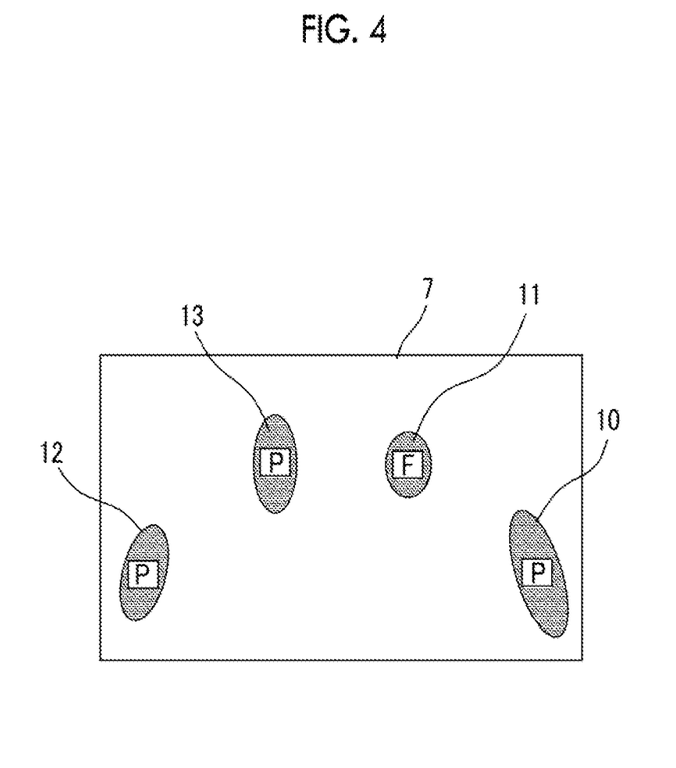
FIG. 4 is a diagram illustrating a state where touches of a finger and a palm are performed in a comparative example.

Next, operational effects of the first embodiment will be described below with reference to FIGS. 4 and 5. FIG. 4 is a diagram illustrating a state where touches of a finger and a palm are performed in a comparative example in which criteria for determining an operation body to be a palm are the same even though the operation body is touched to any position of the operation surface 7. The touch region 10 is caused by a palm, and determination to be a palm is made because an area and an aspect ratio are large. A touch region 11 is caused by a finger, and determination to be a finger is made because an area and an aspect ratio are small. A touch region 12 is caused by a palm, and determination to be a palm is made because an area and an aspect ratio are large.

Here, a touch region 13 is caused by a finger. However, even by the finger, an area and an aspect ratio are relatively large and are the same as those of the touch region 12. For this reason, it may be erroneously determined to be a palm.

Figure 5:
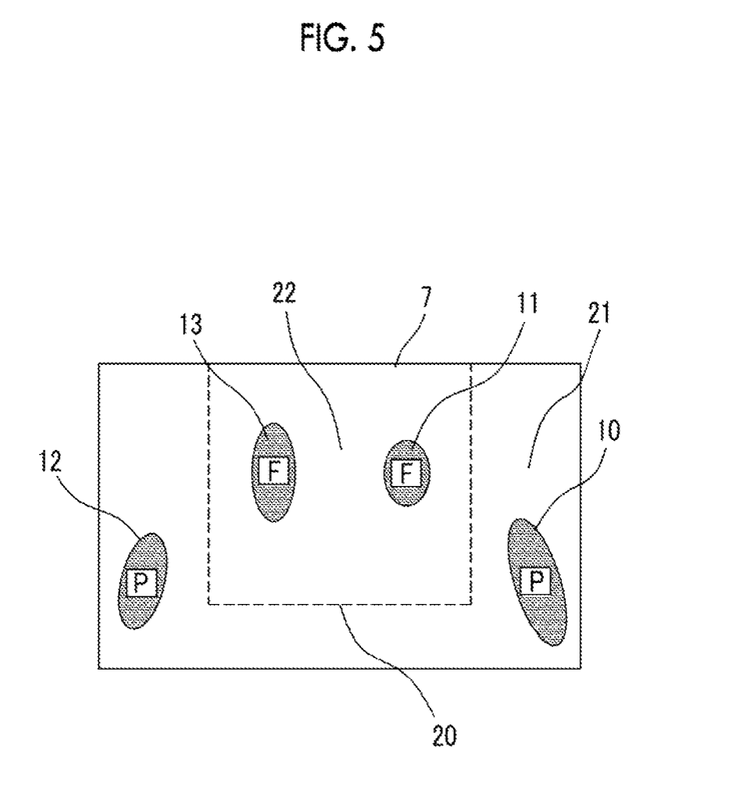
FIG. 5 is a diagram illustrating a state where touches of a finger and a palm are performed in the first embodiment.

FIG. 5 is a diagram illustrating a state where touches of a finger and a palm are performed in the first embodiment. A virtual boundary line 20 is set in the operation surface 7, and outside of the boundary line 20 is a peripheral portion 21 and inside thereof is a central portion 22. The peripheral portion 21 is a location where a palm is positioned frequently. The central portion 22 is a location where a finger is positioned frequently.

Here, the touch region 13 is caused by a finger and has a relatively large area and aspect ratio which are the same as those of the touch region 12. Accordingly, if the touch region 13 is positioned in the peripheral portion 21, determination to be a palm is made. However, in the central portion, a determination condition for determining that the touch region is caused by a palm is strictly set so that it is not determined to be a palm in spite of a relatively large area and aspect ratio. For this reason, it is determined that the touch region 13 is caused by a finger.

In the first embodiment, in a case where a touch position is the peripheral portion 21 in which a palm is positioned frequently, when spatial characteristics (an area and an aspect ratio) which correspond to an area and a length of a touch region exceed a first condition corresponding to a predetermined area and length (when an area is equal to or greater than 3 square centimeters and an aspect ratio is equal to or greater than 3), it is determined that the touch region is caused by a palm. When the spatial characteristics do not exceed the first condition, it is determined that the touch region is caused by a finger. In a case where a touch position is the central portion 22 in which a finger is positioned frequently, when the spatial characteristics exceed a second condition corresponding to an area and a length that are larger than those of the first condition (when an area is equal to or greater than 2 square centimeters and an aspect ratio is equal to or greater than 2), it is determined that the touch region is caused by a palm. When the spatial characteristics do not exceed the second condition, it is determined that the touch region is caused by a finger.

Thus, there is a tendency of being determined to be a palm at a location where a palm is positioned frequently, and there is a tendency of being determined to be a finger at a location where a finger is positioned frequently. For this reason, an operational effect is exhibited which is capable of effectively preventing an operational error from occurring due to a palm and allowing a normal operation by a finger to be smoothly performed.

Figure 6:
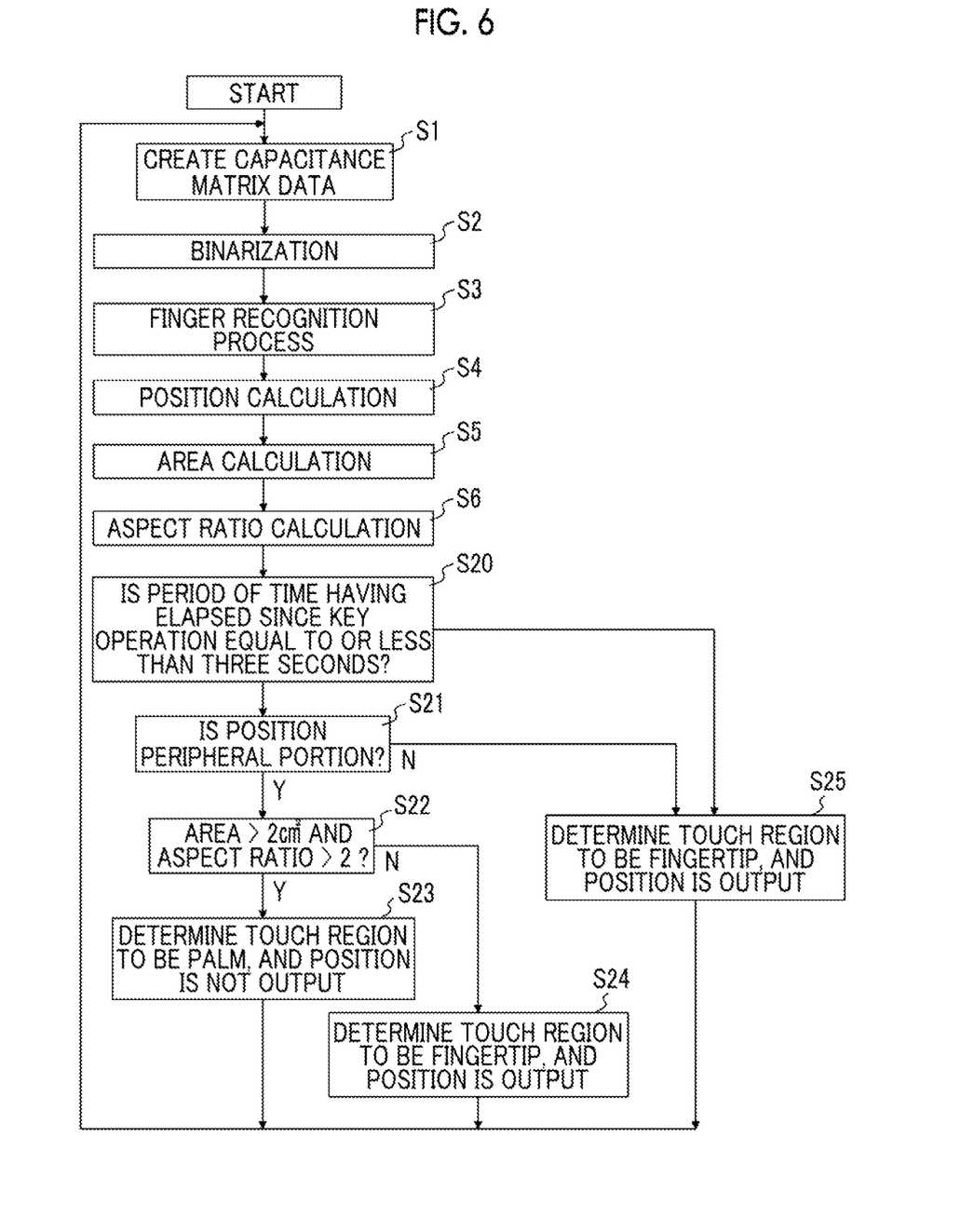
FIG. 6 is a flow chart of control means 6 according to a second embodiment.

Next, a touch pad 1 according to a second embodiment will be described below with reference to FIG. 6. FIG. 6 is a flow chart of control means 6 according to the second embodiment. The same processes as those in the first embodiment are denoted by the same reference numerals and signs, and the description thereof will be omitted.

In step S20, it is determined whether a period of time having elapsed since a key operation of a keyboard is equal to or less than three seconds. When it is determined that the period of time having elapsed since the key operation is equal to or less than three seconds, the operation proceeds to step S21 to determine whether or not a position is a peripheral portion 21. When it is determined that the position is the peripheral portion 21, the operation proceeds to step S22 to determine whether an area is equal to or greater than 2 square centimeters and whether an aspect ratio is equal to or greater than 2. When it is determined that the area is equal to or greater than 2 square centimeters or that the aspect ratio is equal to or greater than 2, the operation proceeds to step S23 to determine that a touch region is caused by a palm, and a position is not output. When it is determined in step S22 that the area is not equal to or greater than 2 square centimeters and that the aspect ratio is not equal to or greater than 2, that is, when the area is less than 2 square centimeters and the aspect ratio is less than 2, the operation proceeds to step S24 to determine that the touch region is caused by a finger. In the first embodiment, the determination condition for determination to be a palm satisfies both conditions of an area and an aspect ratio. However, in the second embodiment, the determination condition may satisfy any one condition of an area and an aspect ratio.

When it is determined in step S20 that a period of time having elapsed since a key operation is equal to or less than three seconds, that is, when three seconds or more have elapsed since the key operation, the operation proceeds to step S25 to determine that a touch region is caused by a finger without condition. In addition, when it is determined in step S21 that the position is not the peripheral portion 21, it is determined that the touch region is caused by a finger without condition.

As described above, in the second embodiment, when it is determined that a keyboard is being operated, a palm determination function is set to be in a valid state. When it is not determined that a keyboard is being operated, the palm determination function is set to be in an invalid state so as to determine that a touch region is caused by a finger without condition.

Accordingly, when a palm is positioned frequently, there is a tendency to be determined to be a palm, and when a finger is positioned frequently, there is a tendency to be determined to be a finger. For this reason, it is possible to effectively prevent an operational error from occurring due to a palm and to smoothly perform a normal operation by a finger.

In the second embodiment, when a touch position is the peripheral portion 21, a palm determination function is set to be in a valid state. When a touch position is the central portion 22, a palm determination function is set to be in an invalid state so as to determine that a touch region is caused by a finger without condition.

Accordingly, being a finger is necessarily determined at a location where a finger is positioned frequently. For this reason, it is possible to smoothly perform a normal operation by a finger.

Meanwhile, the present invention is not limited to the above-described embodiments, and can be implemented by adding various modifications without departing from the scope of the present invention. For example, a determination condition is not changed in the peripheral portion 21 and the central portion 22 which are separated by the boundary line 20, and a determination condition for determination to be a palm may be consecutively changed according to a distance from a center point of the operation surface 7 to a touch position. In addition, a plurality of boundary lines may be set, and a determination condition for determination to be a palm may be strictly set in a step-by-step manner as the touch position approaches the center point of the touch surface 7.

It should be understood by those skilled in the art that various modifications, combinations, sub-combinations and alterations may occur depending on design requirements and other factors insofar as they are within the scope of the appended claims of the equivalents thereof.

What is claimed is:

1. A touch pad comprising:
an operation surface;
a detection unit configured to output a variable signal based on proximity of an object with respect to the operation surface; and
a control unit configured to calculate a touch region and a touch position of the object on the basis of the variable signal, and to perform palm determination to determine whether the object is a finger or a palm based on spatial characteristics of the touch region, the spatial characteristics corresponding to an area or a length of the touch region,
wherein the control unit determines:
when the touch position is in a peripheral portion of the operation surface, that the object is a palm if the spatial characteristics exceed a first condition, and that the object is a finger if the spatial characteristics do not exceed the first condition; and
when the touch position is in a central portion of the operation surface, that the object is a palm if the spatial characteristics exceed a second condition greater than the first condition, and that the object is a finger if the spatial characteristics do not exceed the second condition.

2. The touch pad according to claim 1, wherein the control unit is further configured to determine whether a keyboard is being operated, to enable sets the palm determination if the keyboard is being operated, and to disable the palm determination if the keyboard is not being operated.

3. The touch pad according to claim 1, wherein the first condition includes a first value of both of the area and an aspect ratio of the touch region, and wherein the second condition includes a second value of both of the area and the aspect ratio of the touch region, the second value being greater than the first value.

4. The touch pad according to claim 1, wherein the first condition includes a first value of at least one of the area and an aspect ratio of the touch region, and wherein the second condition includes a second value of at least one of the area and the aspect ratio of the touch region, the second value being greater than the first value.

5. A touch pad comprising:

an operation surface;

a detection unit configured to output a variable signal based on proximity of an object with respect to the operation surface; and a control unit configured to calculate a touch region and a touch position of the object on the basis of the variable signal, and to perform palm determination to determine whether the object is a finger or a palm based on spatial characteristics of the touch region, wherein the control unit is further configured to enable the palm determination when the touch position is in a peripheral portion of the operation surface, and to disable the palm determination when the touch position is in a central portion of the touch surface.

6. The touch pad according to claim 5, wherein the control unit is further configured to determine whether a keyboard is being operated, to enable the palm determination if the keyboard is being operated, and to disable the palm determination if the keyboard is not being operated.

7. The touch pad according to claim 5, wherein the control unit performs the palm determination:

by determining that the object is a palm if the spatial characteristics satisfy a predetermined condition, and that the object is a finger if the spatial characteristics do not satisfy the predetermined condition.

8. The touch pad according to claim 7, wherein the spatial characteristics include an area and an aspect ratio of the touch region.

9. The touch pad according to claim 8, wherein the predetermined condition is that both of the area and the aspect ratio of the touch region exceed a respective predetermined value.

10. The touch pad according to claim 8, wherein the predetermined condition is that at least one of the area and the aspect ratio of the touch region exceeds a respective predetermined value.

* * * * *